United States Patent [19]
Porter et al.

[11] 3,808,740
[45] May 7, 1974

[54] COATED SEEDS AND METHODS
[75] Inventors: Frederic E. Porter, Minneapolis; Howard E. Kaerwer, Jr., Eden Prairie, both of Minn.
[73] Assignee: Northrup, King & Co., Minneapolis, Minn.
[22] Filed: Jan. 8, 1973
[21] Appl. No.: 321,679

[52] U.S. Cl............................ 47/58, 260/2.5, 117/3, 47/57.6
[51] Int. Cl............................................. A01c 1/06
[58] Field of Search................. 47/57.6, DIG. 9, 58; 260/2.5; 117/3

[56] References Cited
UNITED STATES PATENTS
| | | | |
|---|---|---|---|
| 2,579,734 | 12/1951 | Burgesser............................ | 47/57.6 |
| 2,986,840 | 6/1961 | Rogers............................ | 47/DIG. 9 |
| 3,113,399 | 12/1963 | Eversole et al. ...................... | 47/57.6 |
| 3,545,129 | 12/1970 | Schreiber et al...................... | 47/57.6 |
| 3,621,612 | 11/1971 | Porter............................... | 47/57.6 X |
| 3,698,133 | 10/1972 | Schreiber............................ | 47/57.6 |

FOREIGN PATENTS OR APPLICATIONS
| | | | |
|---|---|---|---|
| 936,584 | 9/1963 | Great Britain....................... | 47/57.6 |
| 1,071,804 | 6/1967 | Great Britain....................... | 47/57.6 |
| 6,909,440 | 12/1970 | Netherlands......................... | 47/57.6 |

*Primary Examiner*—Robert E. Bagwill

[57] ABSTRACT

Plant seeds, preferably leguminous, are coated with 0.1–5 parts by weight, per 100 parts by weight of seed, of a film forming material and further coated with at least 10 parts by weight (same basis) of solid particles of an agent such as calcium carbonate while the first coat is semi-solid and tacky. The film-forming material preferably comprises a prepolymer curable with water and/or an amine to a water insensitive but permeable solid. One particularly suitable agricultural use for the resulting coated seeds is in the growing of crops in acid soils.

16 Claims, No Drawings

COATED SEEDS AND METHODS

FIELD OF THE INVENTION

The present invention relates to the coating of angiospermous and gymnospermous plant seeds and more particularly those of commercial importance. One aspect of the invention relates to the coating of seeds with a permeable resin coating that serves to bind particulate matter to the seeds. The particulate matter will vary with the purpose of coating. Among the suitable types of particulate matter are: a powdered mineral substance such as calcium carbonate, limestone, gypsum, vermiculite, diatomaceous earth, clay or the like; pulverized organic matter such as plant residues, peat and the like; and chemical compounds or blends of compounds formulated for specific purposes. A further aspect of the invention relates to the continuous processing of market seed into a suitable coated form. Another aspect of the invention relates to the preparation of coated seeds characterized by a permeable but water insoluble coating that allows prompt entrance of moisture and thus prompt germination of the seed. Yet another aspect relates to the application of a protective coating on seeds that serves as a barrier to adverse environmental influences normal to certain soils.

DESCRIPTION OF THE PRIOR ART

The art of coating plant seeds is highly developed and is known to have many applications in the field of agriculture. One application of the seed coating art relates to "pelletizing" of seeds to make them more uniform in size and easier to handle and plant. Another application of this art relates to introducing an "inoculant" into the seed coating to improve the quality of the plants which emerge from the seed. Other applications of the art include various treatments for the seed such as treatments for plant diseases or pH adjustments for the surrounding soil.

It is known that plant seeds perform better in neutral soils than in acid soils. Alfalfa seed is an example of a plant seed that performs best in neutral to alkaline soils. Most of the alfalfa seed used in the U.S. is planted on acid soils. The problem of soil reaction can be corrected by applying 1–5 tons of an agent such as ground limestone per acre to the soil well in advance of planting. This solution inherently consumes a large amount of time and material. It requires extensive working of the field to insure proper distribution of the agent and it depends on sufficient advance preparation to allow reaction of the agent with soil acids. An alternative method involves the application of a calcareous coating to seeds. Often, the minority of calcareous coating material will produce effects comparable with the application of large quantities of limestone. For convenience, the term "lime" is used in this application to denote calcium carbonate, ground limestone, and similar calcareous materials or mildly basic calcium salts. The term "lime" is generally so used in the field of agriculture.

Although "lime" coating of seeds is a proven technique for improving the growth of leguminous plants such as alfalfa in acid soils, the technique is rarely used in the Midwestern United States. A possible reason for the lack of application of this proven technique relates to the apparently unmet need for a particular balance of properties in the "lime" coating, at least in the case where coated seeds are subjected to the usual conditions of shipping and handling. It is difficult to provide a coating of particles on a seed which is not fragile. Conventionally coated seeds are separated from their coatings by the beating action of certain planting devices. Isolated coating material cannot function properly. Further, the separated coating material can plug planting equipment and thus prevent the uniform and expected flow of seed through the device. Unless a suitable adhesive is firmly bonded to the seed and particles are firmly bound together and/or adhered to the adhesive coating, the ordinary shocks, stresses, and strains of shipping and handling can dislodge significant amounts of particulate matter from the seeds. Of course, if the amount of particulate matter is kept to a minimum, adherence to the seed can be improved. However, most uses of particulate coatings on seed, including pelletizing, call for high loadings of particles —loadings high enough to detract from the effectiveness of the adhesive.

The selection of a suitable adhesive must take into account the germination characteristics of the seed and the sensitivity of the seed to damage caused by harsh chemicals which might be present in typical adhesive compositions. As is described in U.S. Pat. No. 3,621,612 (Porter), issued Nov. 23, 1971, coatings of waxes and various resins, particularly in multiple layers, can render the seed water-resistance and cause delay in the emergence of a seedling from the coated seed. Although this delayed emergence is desirable in various processes of regulating plant growth, it is undesirable in, for example, the conventional methods of growing leguminous plants in acid soils with "lime" coated seed. Accordingly, it is conventional to use water soluble or water dispersible gums or polymers (e.g. gum arabic, methyl cellulose, polyvinyl alcohol, polyoxyethylene glycol-based waxes, carboxymethylcellulose, water soluble polyelectrolytes, and the like) as the adhesive coating or "sticker" to which particulate matter is adhered. These gums and polymers are sufficiently water sensitive or hygroscopic to adsorb enough water to break down or even dissolve the adhesive coating, thus permitting germination to occur as rapidly as if the seed were not coated.

In practice, it has been found that the water soluble and water dispersible coatings conventionally used to make various types of pelletized or "lime" coated seed do not provide a firmly adherent bond between the seed and adhesive coating and/or between the adhesive coating and the particles. There are several possible reasons for the fragile nature of conventional "lime" coatings, probably at least partially related to the chemical nature of the adhesive or the surface of the seed. For example, some seeds (e.g. alfalfa seeds) have a naturally occurring waxy layer on their surfaces which can interfere with adhesion. Some water soluble or water dispersible film-forming polymers tend to form a snug but not adherent envelope around the seed, and this envelope can be broken in shipment, with the result that there are almost no physical forces or chemical forces holding the particles onto the seed. Consequently, the preferred practice of the prior art is to "lime" coat seeds in small batches for use in nearby agricultural regions.

Accordingly, this invention contemplates providing a process, preferably a continuous process, for providing an adherent coating on seeds in which or to which coating can be adhered particulate matter such as pH adjusting agents, inoculants, etc. wherein the resulting coatings on the seeds will not be unduly fragile. Although the adherent coating is generally insensitive to water, it is designed to be sufficiently permeable to allow movement of soil moisture into the seed so as to permit prompt emergence of seedlings from the planted seeds.

SUMMARY OF THE INVENTION

Briefly, the method of the present invention comprises the steps of coating the seeds with 0.1–5 parts per hundred (by weight), based on the weight of the seeds, of an organic film-forming material, preferably a free isocyanate-containing liquid prepolymer, curable with a curing agent such as water or an amine. An outer layer of at least 10 parts per hundred (by weight), based on the weight of the seed, of a finely divided particulate material is then adhered to the inner resinous coating or film. Among the preferred properties of the film-forming material (e.g. the prepolymer) is that it forms a film which is insoluble and non-dispersible in water, yet permeable to water. The permeability to water can be sufficient for normal germination and emergence. In this connection it should also be noted that the preferred practice of this invention is to use only a single coating of the film-forming material; furthermore, the outer particulate layer appears to introduce, in some fashion, additional porosity or discontinuities into the inner coating. Thus, the seeds are not water proof, even though a water insensitive film-former is used to adhere to the outer particulate layer on the seed. Preferably, the outer layer is added while the film-former is still tacky due to the presence of solvent and/or an incomplete state of cure.

A typical product produced according to this process is "lime" coated leguminous (e.g. alfalfa) plant seeds. In field tests in soil similar to the acid soils of the Midwestern Great Plains region of the United States, these coated seeds generally exhibit yield, germination, and emergence characteristics at least comparable to prior art "lime" coated alfalfa seed. In addition, however, the seeds of the present invention are intended to better withstand handling and shipping and the beating action of planting devices.

DETAILED DESCRIPTION

THE SEEDS

The present invention is applicable to all angiospermous and gymnospermous plant seeds, including seeds used to grow crops for market, for silage, or for other agricultural uses. As pointed out previously, the seed coating art applies to a wide variety of grain and vegetable or monocotyledonous and dicotyledonous seeds with varying surface characteristics and varying sensitivity to chemical treatments, soil acidity, and the like. For simplicity, the following description will relate mostly to leguminous plant seeds, e.g. alfalfa seeds, but it should be understood that any plant seeds can be treated according to the present invention if due regard is given to the innate or inherent differences of the particular seed being treated and to the purpose for which the coating is applied.

MATERIALS USED IN COATINGS

In addition to selecting a film-forming material which will not damage the seed, the practice of this invention generally involves coating with water insoluble and water insensitive or non-dispersible film forming material. As a general proposition, any flowable film-forming material with the desired permeability, water insensitivity, and adhesive characteristics can be used, including curable liquid resins, solvent-based systems, aqueous latices, hot melt materals, solidifiable gaseous mixtures, and solids flowable under friction or pressure. However, all these materials do not work with equal effectiveness because of potential harm to the seed and/or relatively poor ability to retain large loadings of particulate matter. The preferred practice of this invention is to use curable prepolymers or polymers such as water insoluble polyurethanes and polyureas which form an adherent bond with the surface of the seed. Commercially available moisture-curable, one-part or two-part polyurethane or polyurea varnishes or adhesives can be used for this purpose, e.g. "Arothane" 181 urethane spray or the like. It is preferred to form and/or chain extend the polyurethane in situ on the surface of the seeds by adding a curing agent such as water (in the form of liquid water or atmospheric moisture) to an isocyanate-containing prepolymer in the initial stages of the coating process. The isocyanate-terminated prepolymer can be dissolved in up to four parts by weight of organic solvent per part of prepolymer. The curing agent can be added a few minutes before the coating of the seed is commenced, provided the prepolymer does not form a gel before it comes in contact with the seeds. A polyurea varnish can be formed from a suitable conventional free isocyanate-containing prepolymer and an amine or polyamine, e.g. ketamine. (The preparation of ketamine is disclosed in Chem. Abstracts, 61, 5569d [1964].) Combinations of curing agents such as water and amine can be used. Although moisture-curing polyurethane varnishes are suitable, slow moisture cures detract from continuous processing and are less preferred. Curing with steam is permissible, provided that the elevated temperature of the steam does not excessively accelerate the cure and that the sensible temperature of the seed is not raised to damaging levels. The use of catalysts to promote curing (e.g. the conventional tertiary amines or organometallic catalysts) can be used if due regard is given to the possible adverse effects on the seed and the desired rate of cure. The rate of cure will be discussed in greater detail subsequently.

Solvent-based systems, particularly water curable prepolymers of the free isocyanate type, are particularly preferred for use in this invention. The use of inert solvents, e.g. in the ratio of 0.5 to 3 or 4 parts of solvent by weight per part of prepolymer, facilitates handling of the prepolymer. For purposes of this invention, acetone is a sufficiently inert solvent for forming prepolymer solutions. Conventional hydrocarbon or chlorinated hydrocarbon solvents (e.g. the liquid aromatics and alkanes) can be used in the manner known in the art and in accordance with the recommendations of resin manufacturers.

The particulate material to be adhered to and/or dispersed in the water insoluble coating on the seed should be finely divided enough so that the particles are much smaller than the seed itself. If a major amount of the particles will pass a 100 mesh (U.S. or Tyler) screen, and preferably will also pass a 200 mesh screen, the particles will ordinarily be small enough for good adherence to any size or shape of seed, regardless of the shape of the particles. Thus, most of the particles will be smaller than 150 microns and a large number of them will be smaller than 75 microns. A typical rule of thumb for "lime" coating with ground marble or reprecipitated calcium carbonate is that 80% or more (by weight) of the particles should be smaller than 75 microns. There is virtually no lower limit to the particle size, but, as a practical matter, most particles will be larger than a few microns. Typically, the particulate material has some effect upon the environment surrounding the seed (e.g. is reactive with soil acids or bases). In the case of agents such as calcium carbonate (less than 0.01% water soluble), no solubility in neutral water is required.

Besides calcium carbonate, it can be useful to coat seeds with one or more of a variety of minerals including vermiculite, diatomaceous earth, gypsum, and various metal silicates and the like. Special treatments such as inoculants and nutrients (peat, coffee grounds, etc.), iron salts to treat diseases, etc. can also form part or all of the particulate outer layer on the seeds. The particulate outer layer can assist in size regulation as well as in any of the aforementioned treatments of the seed. If the particles are relatively large, e.g. about 100 mesh, they are preferably flake-like in shape for good adherence.

It is permissible to disperse some of the particulate matter in the inner adhesive coating. Generally speaking, however, the highest loadings of particulate matter are obtained by adding all or substantially all of the particles as an outer layer.

Adherence to the seed is optimized when 0.1 to 5 parts per hundred (based on the weight of the seed) of the inner, adhesive coating are used, preferably about 1% or about 1 part per 100. A single inner coat of adhesives is preferred for good water permeability and continuous processing. For the outer particulate coating, less than 10 parts per hundred of the particulate material may be operative but is not very effective for most uses, e.g. for pH adjustment of the soil conditions where the seed is planted. About 10–30 parts per hundred, based on the weight of the seed, of the particulate material is an effective treatment range which provides good uniform coating of the seed and good adherence of the particulate matter to the seed.

THE COATING PROCESS

Although it is permissible to coat seeds according to this invention in a batch process, it is preferred to use a continuous process for large volume production. In the continuous process, the seeds are fed to a coating zone provided by a fluidized bed or conveyor (e.g. a screw conveyor such as an auger), and the coating proceeds in two stages: a first stage for the inner coating of adhesive and a second stage for the outer coating of discrete particles such as ground marble or reprecipitated calcium carbonate. The coating zone and both of its coating stages can be provided by a single piece of equipment or a single fluidized bed, but it is generally preferred to use a series of two conveyors, the first conveyor discharging more or less directly onto or into the second conveyor. In the first stage, the prepolymer and curing agent or agents (preferably, though not necessarily, free of particulate matter) are sprayed into the coating zone or physically admixed with the advancing seed. In a preferred approach, seed, water, and free isocyanate-containing prepolymer are fed into an auger more or less simultaneously. The rate of cure of the prepolymer should be manipulated so that the seeds are coated with a fairly uniform single coat of partially cured, semi-solid or gelatinous, highly tacky resin about the time that the thus-coated seeds are discharged or conveyed into the second coating stage. In the second stage, the particulate matter (e.g. −200 mesh "lime") is dusted onto or physically admixed with the coated seeds, resulting in a free-flowing mass of dry seeds. Although the seeds appear to be dry as they are discharged or conveyed from the second coating stage, the partially cured resin can and generally does continue to cure, either due to atmospheric or adsorbed moisture or to liquid water trapped in the inner adhesive film.

An ultimately complete cure with liquid water can be assured by adding roughly 1 to 2 parts by weight of water per part of prepolymer in the first coating stage. This will ordinarily provide an excess over stoichiometry or an NCO/H ratio of less than one.

The cure rate should not be so slow that virtually no curing has occurred prior to commencement of the second coating stage. On the other hand, an excessive rapid cure (e.g. a snap cure with steam) may gel the resin so fast as to jam a screw conveyor, and special conveying techniques or fluidized beds will have to be resorted to. Another problem with the cure rate is that the evolution of carbon dioxide from the NCO/water reaction should not be so rapid as to cause blistering of the coating. Surprisingly, however, liquid water cures have been found to be acceptable. Curing with alcohols is not necessary and is less preferred.

The capacity of a properly designed continuous coating process of this invention using a two stage, 8 inch auger can be in excess of 100 bushels (6,000 lb.) per hour, at least in the case of "lime" coatings for alfalfa seeds. The coated alfalfa can be shipped long distances, stored, and planted in acid soils with substantially normal emergence and good growth of alfalfa.

The principle and practice of this invention is illustrated in the following non-limiting Examples.

EXAMPLE I

This Example illustrates the use of a water-curable free isocyanate-containing prepolymer as the inner adhesive coating and minus 200 mesh calcium carbonate as the outer particulate coating for alfalfa seeds. The adhesive is commercially available from Minnesota Mining and Manufacturing ("3M") Company (St. Paul, Minnesota) under the temporary commercial designation of "XA-2382"; it is a thin, light amber syrup dissolved in acetone at a concentration of 90% bv weight. The acetone solution is hygroscopic prior to water cure, but the resin resulting from the cure cannot be dissolved or dispersed in water and is generally not water-sensitive. Before use, the 90% acetone solution of the adhesive was diluted with acetone to 45 weight percent concentration.

For each 100 pounds of alfalfa seed, one pint of acetone solution of the prepolymer and one pint of water were added to the first stage of a coating zone provided by an auger. The water added with the adhesive was at room temperature. Substantially each seed in the mass of seeds emerging from the first coating stage was covered with an adherent single coat of tacky material. Each hundred pounds of the tacky, coated seed was tumbled with 20 pounds of the calcium carbonate. The resulting "lime" coated seed was free-flowing and easily bagged.

The coated seed produced according to this Example was planted by machine at a nominal setting of 9 pounds per acre. The actual sowing rate at this setting was 8 pounds per acre of the coated seeds. The flow of seeds through the machine was uniform. The reduction in sowing rate is attributable to the increase in particle size caused by the presence of the coating.

EXAMPLE II

This Example illustrates the use of a polyurea varnish dissolved in acetone as the inner adhesive coat or "sticker." The commercially available polyurea varnish was made from ketamine (Chem. Abstracts 61, 5569d [1964]) and isocyanate prepolymer. The proportions of ketamine, isocyanate, and acetone solvent and the relationship of these proportions to adhesion are set forth in the following Table, wherein adhesion is rated from "poor" to "good." [See Table I attached hereto as Insert A on page 14a.]

Although good adhesion was obtained without solvent, the system presented handling problems without dilution. Excess dilution reduced or destroyed the efficacy of the varnish as an adhesive.

EXAMPLE III

Seeds were coated in small batches by applying a urethane resin ("Arothane" 181) from a spray can. Adhesion was rated at "fair." Mixtures of the "Arothane" 181 and the "XA-2382" (See Example I), both as to coating-to-seed and "lime"-to-coating adhesion, were also rated "fair."

TABLE I

Amount in Parts by Weight

| Ketamine | Isocyanate | Acetone (Solvent) | Adhesion |
|---|---|---|---|
| 1 | 1 | 0 | Good |
| 1 | 1 | 1 | Good |
| 1 | 1 | 2 | Good |
| 1 | 1 | 4 | Cloudy Solution, less adhesion |
| 1 | 1 | 8 | Poor |

Many modifications of this invention are possible using techniques and knowledge available to those skilled in the art. For example, coatings can be designed to reduce the impact of various kinds of inhospitable environments on various kinds of seed (including both monocotyledonous and dicotyledonous seed). Coatings can be designed to exclude soil-borne insects, fungi, bacteria, and the like. Coatings can contain pH-adjusting agents for hyperalkaline soils, and can also contain solid materials that dissolve to form buffers. Solid coating agents can also be provided which are generally inert in a dry state but which react in the presence of moisture. Salts or other chemicals can be added to the coating to provide common ion effects.

If a multi-purpose coating is desired, the coating process can be expanded to add a third or even a fourth stage to the coating zone, or a plurality of coating zones can be cascaded. For example, a precision sizing operation can be cascaded with a "lime" coating operation, or a reactant in one layer can be isolated from a co-reactant in another layer by an additional coating operation.

What is claimed is:

1. A method of coating plane seeds comprising the steps of:

a. coating the exposed surfaces of said seeds with 0.1 – 5 parts by weight, per 100 parts by weight of said seeds, of a flowable free isocyanate-containing liquid prepolymer dissolved in up to 4 parts by weight, per part of said prepolymer, of a liquid organic solvent, said prepolymer being capable of being cured with water in place on the exposed surfaces of said seeds to a water permeable solid polyurethane film insoluble and indispersible in water;

b. adding to said prepolymer an amount of liquid water in excess of the amount needed to provide an NCO/H ratio of less than 1;

c. coating onto the coated seeds produced by steps (a) and (b) at least 10 parts by weight, per 100 parts by weight of said seeds, of a particulate mass comprising an agent for treatment for soil conditions, d. said step (c) being commenced before a fully cured polyurethane has been obtained from said prepolymer and said water, but while the partially cured polyurethane is in a tacky, semi-solid state.

2. A method according to claim 1 wherein said step (b) is commenced prior to said step (a), but wherein step (a) is commenced before the prepolymer is converted to a gel by the liquid water.

3. A method according to claim 1 wherein said particulate mass consists essentially of calcium carbonate particles, the major amount of which are less than 150 microns in size.

4. Method of preparing plant seeds with a multiple coating comprising the steps of:

a. feeding said seeds to a coating zone, b. while said seeds are in said coating zone, 1. applying to said seeds a first coating, consisting essentially of a liquid prepolymer capable of being cured to a solid resin in place on the exposed surfaces of said seeds, by contacting said seeds with 0.1–5 parts by weight, per 100 parts by weight of said seeds, of said liquid prepolymer dissolved in up to 4 parts by weight, per part of said prepolymer, of an inert liquid organic solvent, and 2. adding to said liquid prepolymer an amount of prepolymer curing agent sufficient to convert said liquid prepolymer to a water permeable, water insoluble resin;

c. before the conversion from liquid prepolymer to said water insoluble resin is completed, contacting the thus-coated seeds with 10 to 30 parts by weight, per 100 parts by weight of said seed, of a particulate mass comprising discrete calcium carbonate particles, the major amount of said particles being smaller than 150 microns, until individual seeds are provided with an adherent outer layer of said discrete particles, and d. allowing the conversion of the liquid polymer to said resin to be completed after said seeds have been contacted with said particulate mass.

5. A method according to claim 4 comprising the steps of:

a. continuously feeding said seeds to a first stage of a two-stage coating zone;

b. continuously applying said first coating while said seeds are in said first stage of said coating zone;

c. continuously conveying the seeds coated in said first stage of said coating zone to the second stage of said coating zone, and while said seeds are in said second stage, continuously contacting the thus-coated seeds with said particulate mass;

d. continuously discharging the resulting coated seeds from said second stage.

6. A method according to claim 4 wherein said adding of said prepolymer curing agent to said liquid prepolymer is commenced prior to said applying of said first coating, and wherein said applying of said first coating to said seeds is begun before said liquid prepolymer forms a gel.

7. A method according to claim 4 wherein said liquid prepolymer is an isocyanate-terminated prepolymer and said prepolymer curing agent contains active hydrogen.

8. A method according to claim 7 wherein said curing agent is selected from the group consisting of water and an amine.

9. A method according to claim 8 wherein said curing agent is liquid water and the amount of liquid water is greater than the stoichiometric amount needed to cure said liquid prepolymer.

10. A method according to claim 8 wherein a said curing agent is ketamine.

11. A method according to claim 10 wherein the resulting polyurea derived from said ketamine and said liquid prepolymer is further cured with water.

12. A method according to claim 4 wherein said plant seeds are leguminous.

13. A method according to claim 12 wherein said plant seeds are alfalfa seeds.

14. A method of growing alfalfa in acid soil comprising:
a. coating alfalfa seeds in accordance with claim 4 and
b. planting said seeds in acid soil.

15. A method of preparing plant seeds for planting in acid soils comprising the steps of:
a. feeding said seeds to the first stage of a two-stage coating zone,
conveying said seeds through said first stage, and while said seeds are in said first stage of said coating zone,
applying to said seeds a coating composition comprising (1) 0.1–5 parts by weight, per 100 parts by weight of said seeds, of a curable liquid prepolymer dissolved in up to 4 parts by weight, per part of said prepolymer, of an inert liquid organic solvent, and (2) an amount of water or amine sufficient to convert said liquid prepolymer to a solid, water permeable, water insoluble polyurethane or polyurea resin;

c. conveying the resulting coated seeds from said first stage to the second stage of said coating zone, and while said seeds are in said second stage,
contacting the thus-coated seeds with 10 to 30 parts by weight, per 100 parts by weight of said seed, of a particulate mass comprising discrete calcium carbonate particles, the major amount of said particles being smaller than 150 microns, d. discharging the resulting calcium carbonate-coated seeds from said second stage; and e. allowing the partial curing of said polyurethane or polyurea to be completed after said seeds have left said second stage.

16. A coated leguminous plant seed having a multiple coating thereon, said coating comprising:
a. 0.1–5% by weight, based on the weight of said seeds, of a single porous, water permeable resinous coating comprising a water insoluble and water indispersible polyurethane or polyurea resin firmly adhesively bonded to the outer surfaces of said seed, and
b. at least 10% by weight, based on the weight of said seed, of a particulate coating comprising calcium carbonate particles, said particles coating being adherently bonded to said resinous coating, the major amount by weight of said calcium carbonate particles being less than 150 microns in size.

* * * * *

UNITED STATES PATENT OFFICE
CERTIFICATE OF CORRECTION

Patent No. 3,808,740            Dated May 7, 1974

Inventor(s) Frederic E. Porter and Howard E. Kaewer, Jr.

It is certified that error appears in the above-identified patent and that said Letters Patent are hereby corrected as shown below:

In Column 4, lines 20 and 21, "in situ" should be italicized.

In Column 4, line 34 and column 7, line 15, "61" should be italicized or in bold face.

In Column 7, lines 20-21, "attached hereto as Insert A on page 14a" should read --following Example III--.

In Column 7, line 67 (1st line of claim 1), "plane" should read --plant--.

In Column 10, line 1 (5th line of claim 15), a lower case letter b (--b--) should be inserted prior to "conveying".

In Column 10, line 36 (11th line of claim 16), "particles coating" should read --particulate coating--.

Signed and sealed this 24th day of September 1974.

(SEAL)
Attest:

McCOY M. GIBSON JR.                C. MARSHALL DANN
Attesting Officer                  Commissioner of Patents